Feb. 9, 1943.                T. W. LANGLEY                2,310,446
          INSTRUMENT FOR INDICATING THE ATTITUDE AND
                BEHAVIOR OF AIRCRAFT IN FLIGHT
                     Filed May 8, 1939           4 Sheets-Sheet 1

Inventor,
Thomas Winsmore Langley,
by Frank S. Appleman,
Attorney.

Feb. 9, 1943.                T. W. LANGLEY                    2,310,446
         INSTRUMENT FOR INDICATING THE ATTITUDE AND
               BEHAVIOR OF AIRCRAFT IN FLIGHT
                   Filed May 8, 1939            4 Sheets-Sheet 3

Inventor,
Thomas Winsmore Langley,
By Frank S. Ackerman,
Attorney

Patented Feb. 9, 1943

2,310,446

UNITED STATES PATENT OFFICE 2,310,446

INSTRUMENT FOR INDICATING THE ATTITUDE AND BEHAVIOR OF AIRCRAFT IN FLIGHT

Thomas Winsmore Langley, Osterley, England, assignor to Tecalemit, Limited, Brentford, Middlesex, England Application May 8, 1939, Serial No. 272,538
In Great Britain May 9, 1938

10 Claims. (Cl. 33—204)

This invention provides an improved instrument for indicating the attitude and behavior of aircraft in flight.

One object of the invention is to provide such an instrument which is independent of power operated mechanism and which shall be particularly useful in blind flying. It is a disadvantage of certain known instruments that the visual indications which they give of the attitude of the aircraft are on so small a scale as not to be observable without some difficulty. A further object of the present invention, therefore, is to provide the instrument with visual indicating means which, if so desired, shall be adapted to indicate the attitude of the aircraft in an exaggerated or amplified manner.

According to the present invention, an instrument for indicating the attitude and behavior of an aircraft in flight is characterised by the feature that the attitude of the aircraft is indicated by one or more images formed on a surface (preferably partly opaque, such as a ground glass screen) by the reflection of one or more beams of light from one or more reflecting surfaces which is or are mounted for universal movement and which is or are adapted (excepting under abnormal conditions) to remain perpendicular to gravitational force or to the resultant of gravitational and centrifugal forces acting on the machine.

In a preferred constructional form of the invention, the attitude of the aircraft is indicated by two images formed on a surface by the reflection of two beams of light from a single reflecting surface, which is adapted (except under abnormal conditions) to remain perpendicular to gravitational force or to the resultant of gravitational and centrifugal forces acting on the aircraft. In this construction, each of the two beams of light is reflected onto a partly opaque screen from a surface onto which the beam of light is reflected from the said single reflecting surface but, if so desired, the beams of light could be reflected directly onto the screen from the said single reflecting surface. Moreover, the beams of light could be arranged to fall upon two spaced reflecting surfaces, or a single beam of light could be used in the operation of the instrument and reflected on the screen directly or indirectly from a single reflecting surface having the characteristic referred to above.

In any construction, the said reflecting surface, or each if there be two, may be provided by a mirror so mounted in the instrument as to be turnable about two axes arranged at right angles to each other. On the other hand, the reflecting surface could be provided by the surface of a body of mercury or of a suitable liquid arranged in a container, or by a reflector floating on the mercury or liquid. If a mirror is used, as aforesaid, it is preferred to provide it with a pendulum device, which is suitably damped in such a way that it is substantially unaffected by vibrations.

In the above mentioned preferred construction, each of two beams of light used in the operation of the instrument is provided by a lamp combined with a system of lenses and mirrors, including a mirror onto which the light from the said turnable mirror is reflected and from which the light is reflected forwards on to a partly opaque screen. For the convenience of the pilot, it is advantageous to provide the said screen with two circles, spaced equidistantly from the vertical plane of symmetry of the instrument, the various mirrors in the instrument being so disposed that when the aircraft is in normal level flight, two spots of light or images appear centrally in the said circles on the screen. It is also helpful to arrange the said circles on the lateral axis of the representation of an aircraft on the screen, whereby the relative positions of the aircraft and horizon can readily be observed.

If a single beam of light is used in the operation of the instrument, it is preferred to give it a cross section which will produce an image on the screen such that, by association with a fixed outline on the screen, it will readily inform the pilot of the attitude of the machine.

As an alternative to the turnable mirror, it appears possible to use a hollow hemisphere having a mirrored flat surface and arranged within a spherical cup containing a buoyant liquid or, alternatively, a mirrored flat surface provided with a peripheral flange or rim forming part of a spherical surface.

An instrument made in accordance with this invention is particularly advantageous as it can be made to replace the usual fore and aft level, cross level and artificial horizon. It would appear that the only additional instruments necessary for blind-flying are a simple rate of turn indicator, a compass and an altimeter. As will appear hereinafter, however, a rate of turn indicator can, without difficulty, be incorporated in the instrument.

Constructional forms of this invention are illustrated, by way of example, on the accompanying drawings, in which.

Figure 1:
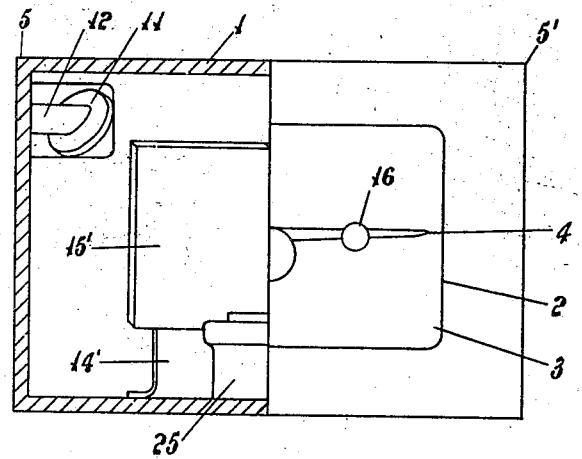
Fig. 1 shows a front elevation of one constructional form of the instrument partly in section on the line 1—1 in Fig. 2.
Figure 2:
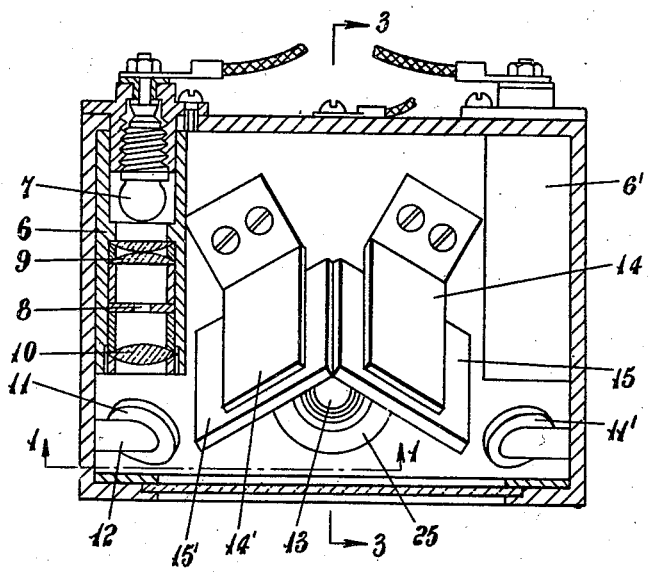
Fig. 2 is a plan view of the instrument with the cover removed.
Figure 3:
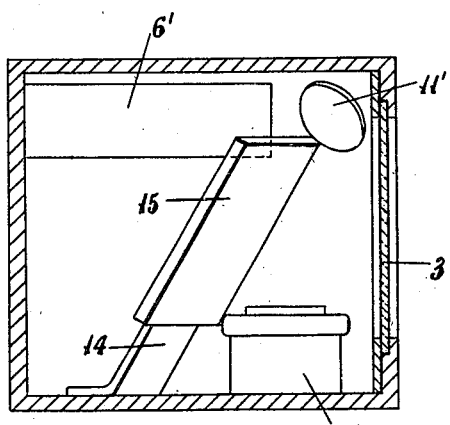
Fig. 3 is a central sectional view on the line 3—3 in Fig. 2.

Referring first to Figs. 1, 2 and 3, a rectangular box 1 is provided with an opening 2 in the front wall thereof in which is mounted a screen 3 which may be of ground glass. On the screen 3 is marked a representation 4 of an aircraft, half of which appears in Fig. 1, the aircraft being shown as flying away from the observer. Adjacent to, and parallel with, the upper fore and aft edges 5 and 5' of the box are mounted tubes 6 and 6', the former of which contains an electric lamp 7, a disc with a central aperture 8, a condenser lens 9 between the lamp and disc for concentrating light from the lamp 7 on to the aperture 8, and a lens 10 which is adapted to direct a beam of light from the aperture 8 on to an inclined mirror 11 supported on a pillar 12 secured to the side of the box. The apparatus is symmetrical about a vertical plane containing the line 3—3 in Fig. 2, and a corresponding set of parts (not shown) is provided in the tube 6' on the right hand side of the instrument, a correspondingly-mounted mirror 11' also being arranged on that side. The electrical connections which are shown for supplying current to the filaments of the lamps are of well known construction and are self-explanatory.

For simplicity in the description which follows, the path of a beam of light from the lamp 7 on the left hand side of the instrument will be considered. The said mirror 11 is set at an angle such that the beam of light reaching it from the lens 10 is reflected downwards towards the centre of a turnably arranged mirror 13, which is supported by gimbal rings in a manner hereafter described. Attached to the bottom of the box by means of supports 14 and 14' are mirrors 15 and 15', each of which is inclined in two planes as shown in Figs. 2 and 3, the two mirrors being symmetrically disposed about the centre of the mirror 13. The right hand mirror 15 is positioned so that, when the aircraft is flying level on an even keel and the bottom of the box 1 is in a horizontal plane, the light beam reflected by the mirror 13, which is then horizontal, reaches it approximately at its centre. The inclination of the mirror 15 is also determined so that the light beam received by it from the horizontal mirror 13 shall be reflected forwardly therefrom on to the screen 3. The screen is provided with two circles 16 and 16' (the former only shown in Fig. 1) which lie on the lateral axis of the representation 4 of the aircraft and are spaced equidistantly from the plane of symmetry of the instrument passing through the centre of the mirror 13. It is arranged that the focal length and the setting of the lens 10 shall be such that a well defined image of the aperture 8 shall be produced on the screen 3 and that, when the bottom of the box is in a horizontal plane, the said image shall fall centrally within the circle 16 of the diagram 4. It will be understood that, in like manner, when the aircraft is in straight flight on an even keel a well-defined image of the aperture corresponding to the aperture 8 but on the opposite side of the axis of symmetry of the casing will fall centrally within the circle 16' on the screen. Thus, in these circumstances the pilot observes two illuminated circles or spots of light lying on the lateral axis of the representation 4 of the aircraft and change in the attitude of the aircraft will be indicated to the pilot by the movement of the said spots of light relatively to the said axis.

Figure 4:
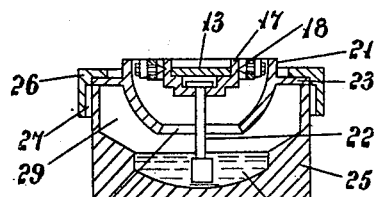
Fig. 4 shows a section on the line 4—4 in Fig. 5.
Figure 5:
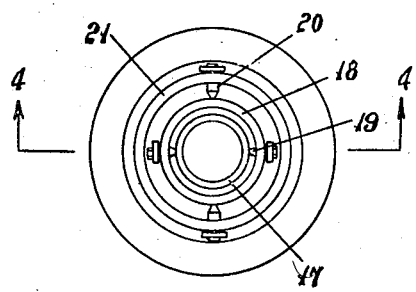
Fig. 5 shows a plan view of a detail of the construction.

Referring now to Figs. 4 and 5, the horizontal mirror 13 is supported in a circular frame 17, which is pivotally mounted in a gimbal ring 18, the common axis of pivots 19 between the frame 17 and the ring 18 being at right angles to the common axis of pivots 20 between the ring 18 and a supporting member 21 in a well known manner. Attached to the centre of the frame 17 is a pendulum 22, the construction being such that in the absence of accelerating forces, the reflecting surface of the mirror 13 will be horizontal irrespective of the position of the supporting member 21 provided that member is not tilted sufficiently to cause the pendulum 22 to make contact with it. The supporting member 21 is of hemispherical form and is provided with an outwardly-turned flange 23, and an opening 24 through which the pendulum 22 passes. The flange 23 of the supporting member 21 is clamped between an oil pot 25 and a ring 26, which screws on to the said oil pot by co-acting screw threads 27. A cavity 28 is provided in the oil pot which is intended to contain oil into which the lower end of the pendulum 22 dips, the viscosity of the oil being such that the pendulum is not unduly affected by vibration. The cavity 28 communicates with a space 29, which is formed between the oil pot 25 and the supporting member 21 and is constructed to receive oil from the cavity when the oil pot is tilted. The space 29 and the cavity 28 are correlated, after the manner of known non-spill containers, so that whatever the position of the oil pot, no oil can escape through the opening 24. The oil pot 25 is secured to the base of the instrument in the position illustrated by Figs. 1 to 3.

Figure 6:
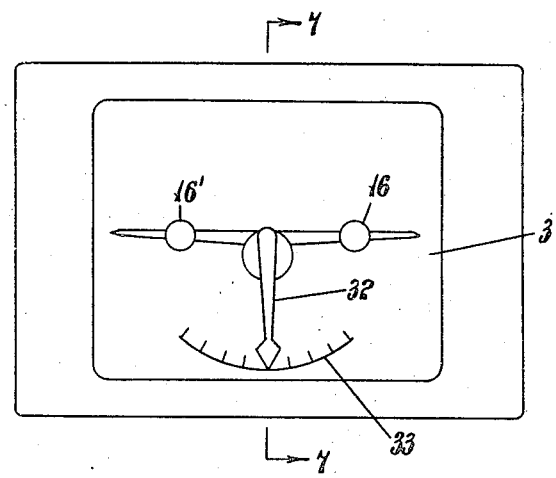
Fig. 6 shows a front view of a modified construction, in which a rate of turn indicator is added.
Figure 7:
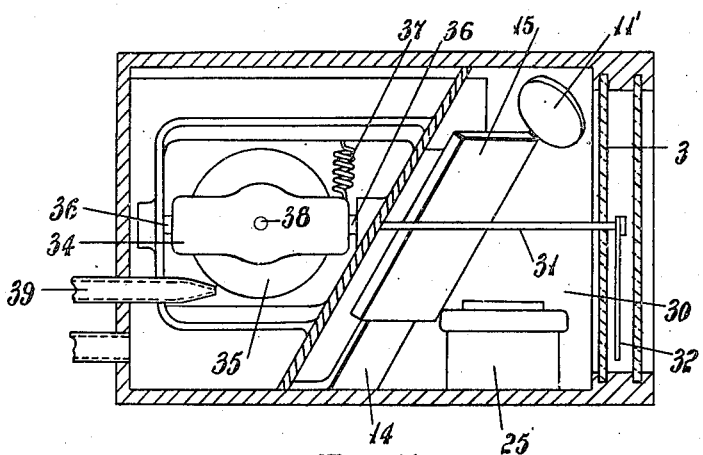
Fig. 7 shows a sectional view on the line 7—7 of Fig. 6.

Referring now to Figs. 6 and 7, which show a modified construction of instrument including a rate of turn indicator of known construction, the space indicated by the numeral 30 is fitted with an arrangement of parts equivalent to that already described, the screen on which the light images are received being shown at 3. Passing through the screen and extending through an opening formed between the adjacent edges of the mirrors 15 and 15' is a small shaft 31, to the front end of which is secured an index needle 32 arranged to read against a scale 33 formed on the screen 3. The opposite end of the shaft 31 is attached to a frame 34 in which is rotatably mounted a shaft 38 carrying a gyroscope wheel 35, the frame being mounted on bearings 36 the axis of which coincides with the axis of the shaft 31. A spring 37 is connected between the frame 34 and the casing of the instrument at points immediately above the common axis of the bearings 36, the construction being such that when there is no gyroscopic couple acting upon the frame 34, the shaft 38 of the wheel 35 is mutually parallel to the base and the screen of the instrument. The edge of the wheel 35 is provided with vanes of known construction, on which impinges a jet of air fed through a nozzle 39 by any suitable means.

Figure 8:
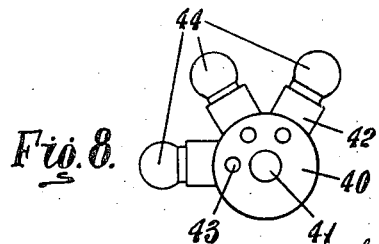
Fig. 8 shows a modified construction of lamp holder.

In the event that one of the electric lamps 7 is burnt out while in use, it is desirable to be able to substitute a new bulb quickly. One means for achieving this is illustrated by the construction shown by Fig. 8 and this construction may be substituted for the construction of lamp holder illustrated in Fig. 2. In the construction of Fig. 8, a disc 40 of insulating material is mounted on a rotatable metal shaft 41. To the edge of the disc 40 is secured a plurality of lamp sockets 42 of the screw-in type, each insulated from the others but electrically connected to a contact stud 43 on the face of the disc 40. The shaft 41 is constructed to make electrical contact with central contacts of the lamps 44 in a known manner. This lamp holder may be mounted in the casing in any suitable manner, the casing being fitted with a contact member (not shown) which, when one of the electric lamps 44 is in a working position, makes contact with the corresponding stud 43. The said contact member is insulated from the casing of the instrument and is connected with a suitable source of electrical energy. The shaft 41 is arranged to make electrical contact with the casing which is connected to an earth return to the said source of electrical energy. Any suitable means may be employed for rotating the disc 40 so as to bring the electric lamps 44 successively into the working position.

Figure 9:
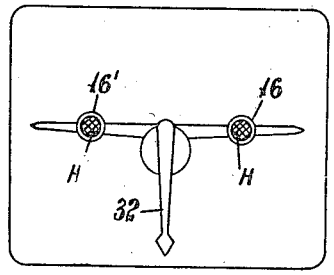
Figs. 9 to 15 illustrate various readings obtained by an instrument constructed according to Figs. 1 to 7 during flight.
Figure 10:
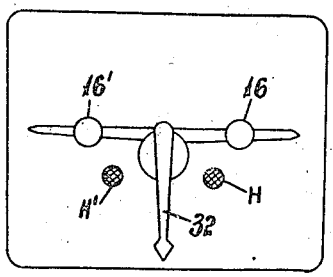
Figure 11:
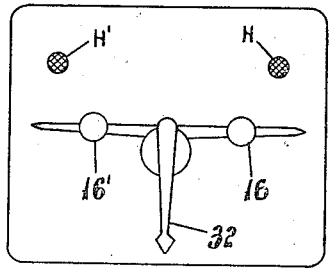

It is intended that the instrument should be attached to an aircraft so that its plane of symmetry is on or parallel to the plane of symmetry of the aircraft, the screen 3 being in front of the pilot. It should be adjusted so that the images of the apertures 8 and 8', or light spots H and H' appear centrally within the circles 16 and 16' when the aircraft is in normal horizontal flight, see Fig. 9. The action of the instrument will then be as follows. When the aircraft is steadily gliding, the mirror 13 will remain horizontal owing to its mounting. The angle between the mirror 13 and the mirror 15 will be increased, with the result that the light spots H and H' on the screen will rise relatively to the diagram 4 thereon, see Fig. 11. In climbing, the opposite result will be obtained, of course. It can be shown that when the aircraft is climbing or gliding on an even keel, the light spots move along lines approximately inclined at 45° on the screen so that they approach when climbing and recede when gliding, as shown in Figs. 10 and 11. Assuming that the machine rolls to the left during straight flight, the mirror 13 will still remain horizontal, so that the angle between it and the left hand mirror 15' will be increased, while the angle between the mirror 13 and the right hand mirror 15 will be decreased, with the result that the right hand light spot H is lowered while the left hand light spot H' rises, see Fig. 15. It can be demonstrated that during this movement the rising spot H' approaches a vertical centre line on the screen while the falling spot H recedes from the said vertical centre line, so that the impression gained from the screen is that the machine is side-slipping to the left. This, of course, is what would occur during the manoeuvre considered.

Figure 12:
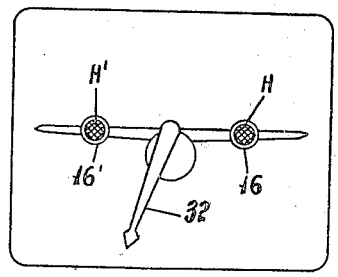
Figure 13:
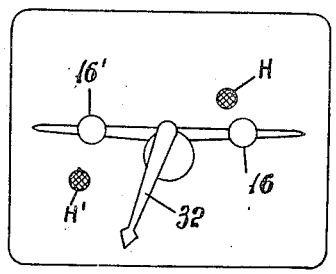
Figure 14:
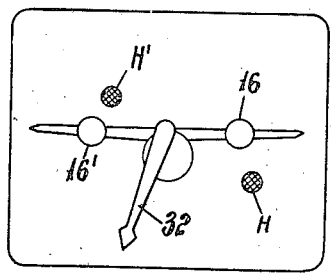

During a level and correctly-banked turn, the spots H and H' should remain in the circles 16 and 16', see Fig. 12. This will be understood when it is remembered that, during such a turn, the resultant of the gravitational and centrifugal forces on the aircraft would act along the yaw or normal axis of the machine and, as the pendulum 22 is subjected to proportional gravitational and centrifugal forces, it would take up a position parallel to the yaw axis, so that the relationship between the mirrors 13 and 15 would be the same as for straight level flight.

Figure 15:
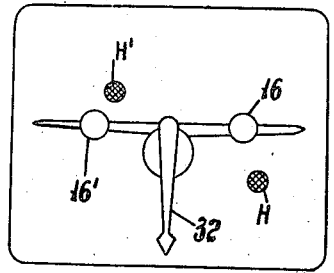

The action of the rate of turn indicator is well known and it will now be possible to understand the indications furnished by an instrument constructed according to Figs. 6 and 7, as illustrated by Figs. 9 to 15. For example, Fig. 9 indicates straight level flight, Fig. 10 indicates a straight climb while Fig. 11 shows a straight glide. Fig. 12 indicates a correctly banked turn to the left, Fig. 13 a flat turn to the left, and Fig. 14 an overbanked turn to the left. Fig. 15 indicates side-slipping to the left during straight flight.

For the constructions shown in Figs. 1 to 3, the movements of the light spots H and H' would be the same as illustrated in Figs. 9 to 15 but information regarding the rate of turn would, of course, need to be obtained from another source.

Various modifications may be employed. For example, two independent horizontal mirrors may be used, one for each beam of light.

What I claim is:

1. An instrument for indicating the attitude and behavior of aircraft in flight, comprising a casing, a lamp arranged at each side and at the front upper part of said casing, a fixed mirror aligned with each lamp, said mirror being disposed at the upper rear part of said casing with its reflecting surface directed and inclined downwardly and inwardly, a lens system for directing a beam of light from each lamp on to each of said mirrors, a mirror mounted for universal movement and disposed near the bottom of said casing and centrally between the said two lamps and mirrors, said universally-mounted mirror being adapted, except under abnormal circumstances, to remain perpendicular to gravitational force or to the resultant of gravitational and centrifugal forces acting on the aircraft and to receive beams of lights from said lamps directed on to it from said first mentioned mirrors, a screen disposed at the rear of said universally-mounted mirror, and inclined mirrors disposed in front of the latter in positions to reflect on to said screen, so as to form two spaced images thereon, the beams of light reflected to the universally-mounted mirror from said first mentioned mirrors.

2. An instrument for indicating the attitude and behavior of aircraft in flight, comprising a casing, a screen at the rear of said casing, two lamp-holders disposed on opposite sides of the plane of symmetry of said casing, each being arranged at the front upper part of said casing, a lamp in each holder, a lens tube aligned with each lamp, said tube containing an apertured partition, a condenser lens arranged between said lamp and said partition, said lens being adapted to concentrate light from said lamp on to the aperture, mirrors arranged in said casing at the rear upper part thereof, each said mirror being aligned with one of said lens tubes and having its reflecting surface inclined downwardly and inwardly, a lens arranged between said partition and each said mirror, said lens being adapted to direct a beam of light from said aperture on to said mirror, a reflecting surface arranged in said casing at the front of said screen near to the bottom of the casing with its centre on a vertical plane midway between vertical planes passing through said lens tubes, said reflecting surface being mounted for universal movement and adapted, except under abnormal conditions, to remain perpendicular to gravitational force or to the resultant of gravitational and centrifugal forces acting on the aircraft, and two mirrors each inclined in two planes arranged at the front of said reflecting surface, so as to reflect on to said screen the beams of light reflected to said reflecting surface from said first mentioned mirrors.

3. The instrument claimed in claim 2, wherein the said reflecting surface consists of a mirror mounted for universal movement in gimbal rings.

4. The instrument claimed in claim 2, wherein the said reflecting surface consists of a reflector floated upon mercury in a container having a hemispherical end.

5. An instrument for indicating the attitude and behavior of aircraft in flight, comprising a casing, two spaced sources of light therein, a support fixed in the casing between the sources of light, a single movable reflecting surface, means for carrying the said reflecting surface, said reflecting surface and said means being arranged for universal movement upon, and relatively to, said support so that both said surface and said means will remain perpendicular to gravitational force or to the resultant of gravitational and centrifugal forces acting on the aircraft irrespective of the attitudes assumed by the aircraft and said support during flight, means including a mirror for directing a beam of light from each of said sources of light on to said reflecting surface, an observation screen whereon images can be formed by beams of light reflected from said reflecting surface, and mirrors for reflecting on to said observation screen the beams of light reflected on to said last mentioned mirrors from said reflecting surface.

6. An instrument for indicating the attitude and behavior of aircraft in flight, comprising a casing, two spaced sources of light therein, two mirrors fixed in the casing each associated with the respective one of said sources of light, lens systems for directing a beam of light from each source of light on to its associated mirror, a support fixed in the casing between the sources of light, a single movable reflecting surface, means for mounting said reflecting surface, for universal movement upon and relatively to said support so that the movable reflecting surface will remain perpendicular to gravitational force or to the resultant of gravitational and centrifugal forces acting on the aircraft irrespective of the attitudes assumed by the aircraft and said support during flight, each of said fixed mirrors directing a beam of light from its associated source of light on to said single reflecting surface, a screen disposed on one side of the latter whereon images may be formed by beams of lights directed thereon, and two spaced mirrors fixed in the casing and disposed on the opposite side of said reflecting surface and adapted to reflect on to the said screen, so as to form spaced images thereon, the beams of light reflected on to them from said reflecting surface.

7. An instrument for indicating the attitude and behavior of aircraft in flight, comprising a casing, a single source of light therein, a mirror fixed in the casing and aligned with said source and having its reflecting surface inclined and directed downwardly, a lens system between said source of light and said fixed miror, a support fixed in the casing below said mirror, a movable mirror, means for mounting said movable mirror, for universal movement upon and relatively to said support so that the movable reflecting surface will remain perpendicular to gravitational force or to the resultant of gravitational and centrifugal forces acting on the aircraft irrespective of the attitudes assumed by the aircraft and said support during flight, said fixed mirror being adapted to reflect a beam of light from said light source on to said universally-mounted mirror, a screen disposed at the rear of the last mentioned mirror, and a mirror disposed at the front thereof and adapted to reflect the beam of light reflected on to it from said universally-mounted mirror rearwardly on to said screen so as to form an image thereon.

8. An instrument for indicating the attitude and behavior of aircraft in flight, comprising a casing, two spaced sources of light therein, two spaced supports fixed in the casing, each being below and to the rear of one of the said sources of light, two spaced reflecting surfaces one of which cooperates with one of said light sources and one with the other, means for carrying each of said reflecting surfaces, each reflecting surface and the said means by which it is carried being arranged for universal movement upon and relatively to one of said supports so that the two reflecting surfaces and the means carrying the same will remain perpendicular to gravitational force or to the resultant of gravitational and centrifugal forces acting on the aircraft irrespective of the attitudes assumed by the aircraft and said supports during flight, means for directing a beam of light from one of said sources of light on to one of the said reflecting surfaces, means for directing a beam of light from the other source of light on to the other reflecting surface, and an observation screen whereon spaced images are formed by the reflections on to said screen of the beams of light directed on to said reflecting surfaces by said light-directing means.

9. The instrument claimed in claim 6, wherein the said screen is provided with the representation of an aircraft flying away from the observer and with two circles spaced equidistantly on opposite sides of the plane of symmetry of said representation, to facilitate the interpretation of the positions and movements of said images.

10. The instrument claimed in claim 7, wherein the said source of light consists of a lamp disposed at the end of a lens tube, the inner end of which is closed except for a slit, the light issuing from the slit striking the centre of said reflecting surface wherefrom it is reflected on to said movable mirror, and said image thus taking the form of a pencil of light which, when the aircraft is flying on an even keel, is made to lie upon an artificial horizon depicted on the said screen.

THOMAS WINSMORE LANGLEY.